(12) United States Patent
Hu et al.

(10) Patent No.: US 10,756,626 B2
(45) Date of Patent: Aug. 25, 2020

(54) POWER CONVERSION CIRCUIT

(71) Applicant: ASUSTeK COMPUTER INC., Taipei (TW)

(72) Inventors: Wei-Bo Hu, Taipei (TW); Zhao-Long Dong, Taipei (TW); Ching-Ji Liang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/114,331

(22) Filed: Aug. 28, 2018

(65) Prior Publication Data
US 2019/0068059 A1 Feb. 28, 2019

(30) Foreign Application Priority Data

Aug. 30, 2017 (CN) .......................... 2017 1 0765104

(51) Int. Cl.
| | |
|---|---|
| *H02M 3/158* | (2006.01) |
| *H02M 1/32* | (2007.01) |
| *H02M 1/38* | (2007.01) |
| *G05F 1/10* | (2006.01) |
| *H02M 3/335* | (2006.01) |

(Continued)

(52) U.S. Cl.
CPC .............. *H02M 3/158* (2013.01); *G05F 1/10* (2013.01); *H02M 1/08* (2013.01); *H02M 1/32* (2013.01); *H02M 1/38* (2013.01); *H02M 3/33507* (2013.01); *H02M 2001/0006* (2013.01)

(58) Field of Classification Search
CPC ......... H02M 3/155–1588; H02M 1/08; H02M 1/32; H02M 1/36; H02M 1/38; H02M 2001/0006; H02M 2001/322; H02M 2001/325; H03K 17/0822; H03K 17/08;
(Continued)

(56) References Cited

U.S. PATENT DOCUMENTS

| 4,771,357 A | 9/1988 | Lorinez et al. |
| RE33,941 E * | 5/1992 | Lorincz .............. H03K 17/0826 323/278 |

(Continued)

FOREIGN PATENT DOCUMENTS

| CN | 1732612 A | 2/2006 |
| CN | 103973106 A | 8/2014 |

(Continued)

*Primary Examiner* — Thienvu V Tran
*Assistant Examiner* — Ivan Laboy
(74) *Attorney, Agent, or Firm* — McClure, Qualey & Rodack, LLP (57) ABSTRACT

A power conversion circuit includes a voltage regulator circuit and a detection circuit. The voltage regulator circuit includes a first switch and a second switch. A first end of the first switch receives an input voltage, and a control end of the first switch receives a first drive signal. The second switch is coupled between a second end of the first switch and the ground, and is turned on or off based on a second drive signal. The first switch and the second switch regulate the input voltage to output an output voltage. The detection circuit is configured to determine whether the first switch is short-circuited or not based on a voltage level of at least one of the first end, the second end, or the control end of the first switch, and adjust the second drive signal when the first switch is short-circuited, to turn on the second switch.

4 Claims, 6 Drawing Sheets

(51) Int. Cl.
*H02M 1/08* (2006.01)
*H02M 1/00* (2006.01)

(58) Field of Classification Search
CPC .......... H03K 17/081–0828; G05F 1/10; H02H 7/1227; H02H 7/1257
See application file for complete search history.

(56) References Cited

U.S. PATENT DOCUMENTS

| | | | |
|---|---|---|---|
| 5,777,461 A * | 7/1998 | Massie | H02M 1/38 323/282 |
| 6,153,896 A * | 11/2000 | Omura | H01L 29/7395 257/139 |
| 6,873,191 B2 | 3/2005 | Dequina et al. | |
| 9,787,185 B2 | 10/2017 | Lo Iacono et al. | |
| 2010/0013450 A1* | 1/2010 | Huang | H02M 1/32 323/282 |
| 2013/0038343 A1 | 2/2013 | Tu et al. | |
| 2015/0303685 A1* | 10/2015 | Wang | H02H 9/041 323/271 |

FOREIGN PATENT DOCUMENTS

| | | | |
|---|---|---|---|
| CN | 105429464 A | 3/2016 | |
| JP | 2012222498 A | 11/2012 | |
| JP | 2016034175 A | 3/2016 | |
| TW | 201307861 A1 | 2/2013 | |

* cited by examiner

POWER CONVERSION CIRCUIT

CROSS-REFERENCE TO RELATED APPLICATION

This application claims the priority benefit of Chinese application serial No. 201710765104.5, filed on Aug. 30, 2017. The entirety of the above-mentioned patent application is hereby incorporated by reference herein and made a part of specification.

BACKGROUND OF THE INVENTION

Field of the Invention

The invention relates to a power conversion circuit, and in particular, to a power conversion circuit having a short-circuit detection mechanism.

Description of the Related Art

Operating electronic devices requires power supplied therein by power supply apparatus. When a power supply apparatus that connecting the electronic device is charged, unstable power input would damage the electronic elements in the electronic device. In an embodiment, for a processor in a computer, when there is an excessively high surge voltage or an excessively large instantaneous current supplied into the processor during operation, an error or burning out occurs.

BRIEF SUMMARY OF THE INVENTION

The disclosure relates to a power conversion circuit. The power conversion circuit includes a voltage regulator circuit and a detection circuit. The voltage regulator circuit includes a first switch and a second switch. A first end of the first switch receives an input voltage, and a control end of the first switch receives a first drive signal. The second switch is coupled between a second end of the first switch and the ground. The second switch is turned on or off based on a second drive signal, and the first switch and the second switch regulate the input voltage to output an output voltage. A detection circuit is configured to determine whether the first switch is short-circuited or not based on a voltage level of at least one of the first end, the second end, or the control end of the first switch, and adjust the second drive signal when the first switch is short-circuited to turn on the second switch.

In conclusion, in the disclosure, an input voltage or a voltage at two ends of a high-side transistor is detected to determine whether the high-side transistor is short-circuited or not, and further to protect a load.

BRIEF DESCRIPTION OF THE DRAWINGS

To make the foregoing and other objectives, features and advantages of the disclosure and embodiments clearer and more comprehensible, the accompanying drawings are described as follows.

DETAILED DESCRIPTION OF THE EMBODIMENTS

"First", "second", "third", and so on that are used in this specification do not specifically mean an order or a rank and are not intended to limit the disclosure, but merely to distinguish elements or operations described by using a same technical term.

A term "coupled" used in this specification means "electrically coupled", and a term "connected" means "electrically connected". "Coupled" and "connected" also mean that two or more elements cooperate or interact with each other.

Figure 1:
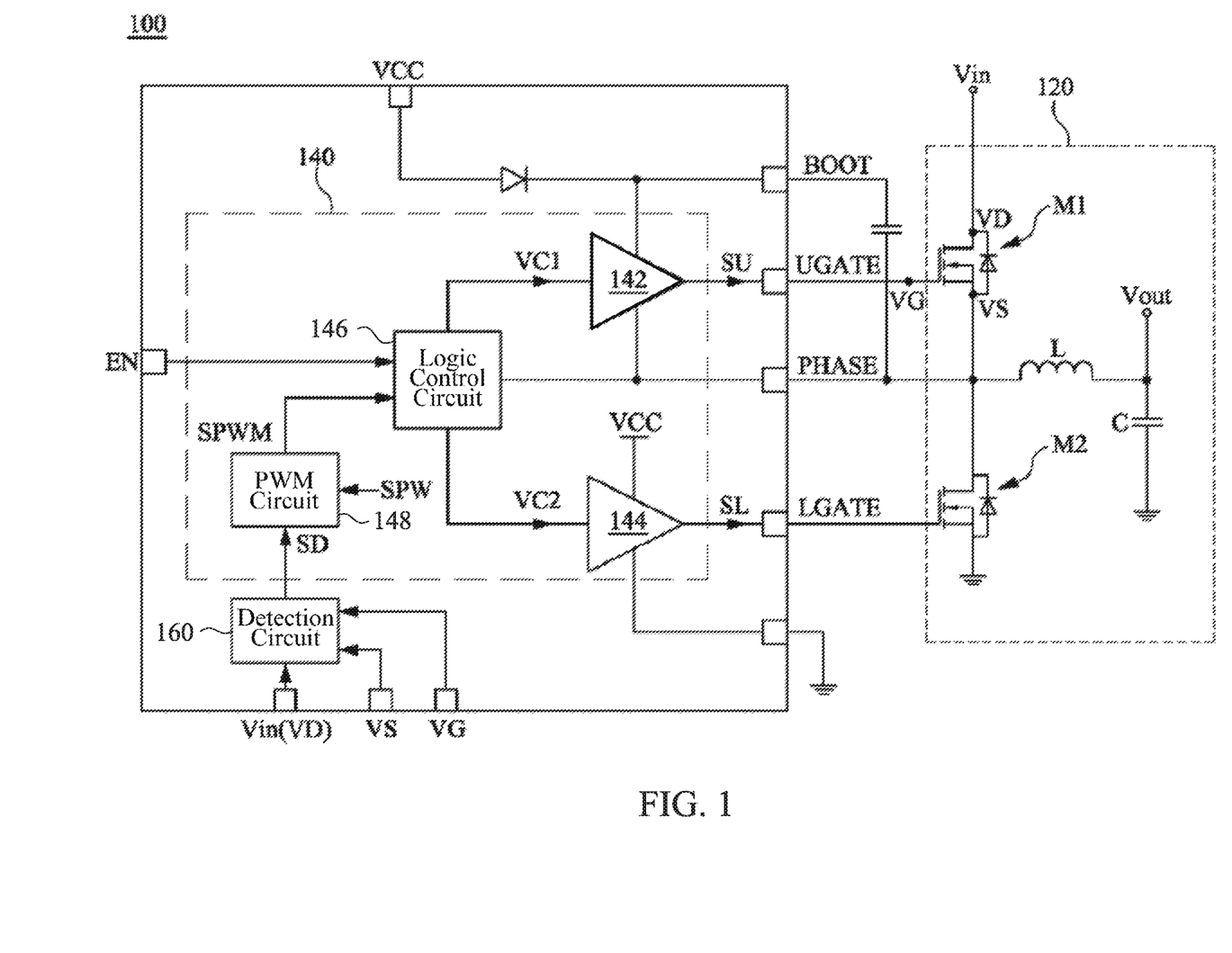
FIG. 1 is a schematic diagram of a power conversion circuit according to an embodiment of the disclosure.

Referring to FIG. 1, FIG. 1 is a schematic diagram of a power conversion circuit according to an embodiment of the disclosure. A power conversion circuit 100 generates an output voltage Vout based on an input voltage Vin to supply to a load.

In an embodiment, the power conversion circuit 100 includes a voltage regulator circuit 120, a drive circuit 140, and a detection circuit 160. The voltage regulator circuit 120 includes a first switch M1, a second switch M2, an output inductor L and an output capacitor C. A first end of the first switch M1 receives the input voltage Vin. A second end of the first switch M1 and the output inductor L are coupled to an endpoint PHASE. A control end of the first switch M1 is coupled to an endpoint UGATE to receive a first drive signal SU. A first end of the second switch M2 is coupled to the endpoint PHASE. A second end of the second switch M2 is coupled to the ground. A control end of the second switch M2 is coupled to an endpoint LGATE to receive a second drive signal SL. The output inductor L and the output capacitor C are coupled to an endpoint to generate the output voltage Vout.

In an embodiment, the first switch M1 and the second switch M2 are implemented by using a metal-oxide-semiconductor field-effect transistor (MOSFET), but it is not limited herein. In an embodiment, the first switch M1 is a high-side transistor, and the second switch M2 is a low-side transistor.

The drive circuit 140 includes a first drive 142, a second drive 144, a logic control circuit 146, and a pulse width modulation (PWM) circuit 148. In an embodiment, the first drive 142, the second drive 144, and the logic control circuit 146 are operated as a control circuit of the voltage regulator circuit 120. The control circuit is configured to generate the first drive signal SU and the second drive signal SL to control the first switch M1 and the second switch M2.

The first drive 142 is coupled to an endpoint BOOT to be driven by a voltage VCC. An output end of the first drive 142 is coupled to the endpoint UGATE. The first drive 142 outputs the first drive signal SU based on a first control signal VC1. The second drive 144 is driven by the voltage VCC. An output end of the second drive 144 is coupled to the endpoint LGATE. The second drive 144 outputs the second drive signal SL based on a second control signal VC2.

The logic control circuit 146 generates the first control signal VC1 and the second control signal VC2 based on a PWM signal SPWM and an enabling signal EN. In an embodiment, the logic control circuit 146 is implemented by using one or more digital logic circuits, but the disclosure is not limited herein. The PWM circuit 148 generates the PWM signal SPWM based on a detection signal SD and a preset pulse signal SPW.

The detection circuit 160 is coupled to the drive circuit 140 and the first switch M1. The detection circuit 160 is configured to detect whether the first switch M1 is short-circuited or not. When detecting that the first switch M1 is short-circuited, the detection circuit 160 outputs the corresponding detection signal SD. The PWM circuit 148 adjusts the second drive signal SL based on the detection signal SD to turn on the second switch M2. Therefore, the output voltage Vout is pulled down to the ground through the second switch M2 to protect the load.

In an embodiment, the detection circuit 160 is configured to detect whether the first switch M1 is short-circuited or not based on the input voltage Vin (that is, a first voltage level of the first switch M1). In another embodiment, the detection circuit 160 is configured to detect whether the first switch M1 is short-circuited or not based on a first voltage level (hereinafter referred to as a voltage level VD) of the first end of the first switch M1 and a second voltage level (hereinafter referred to as a voltage level VS) of the second end (that is, the endpoint PHASE) of the first switch M1. In still another embodiment, the detection circuit 160 is configured to detect whether the first switch M1 is short-circuited or not based on the voltage level VS and a third voltage level (hereinafter referred to as a voltage level VG) of the control end (that is, the endpoint UGATE) of the first switch M1.

Figure 2:
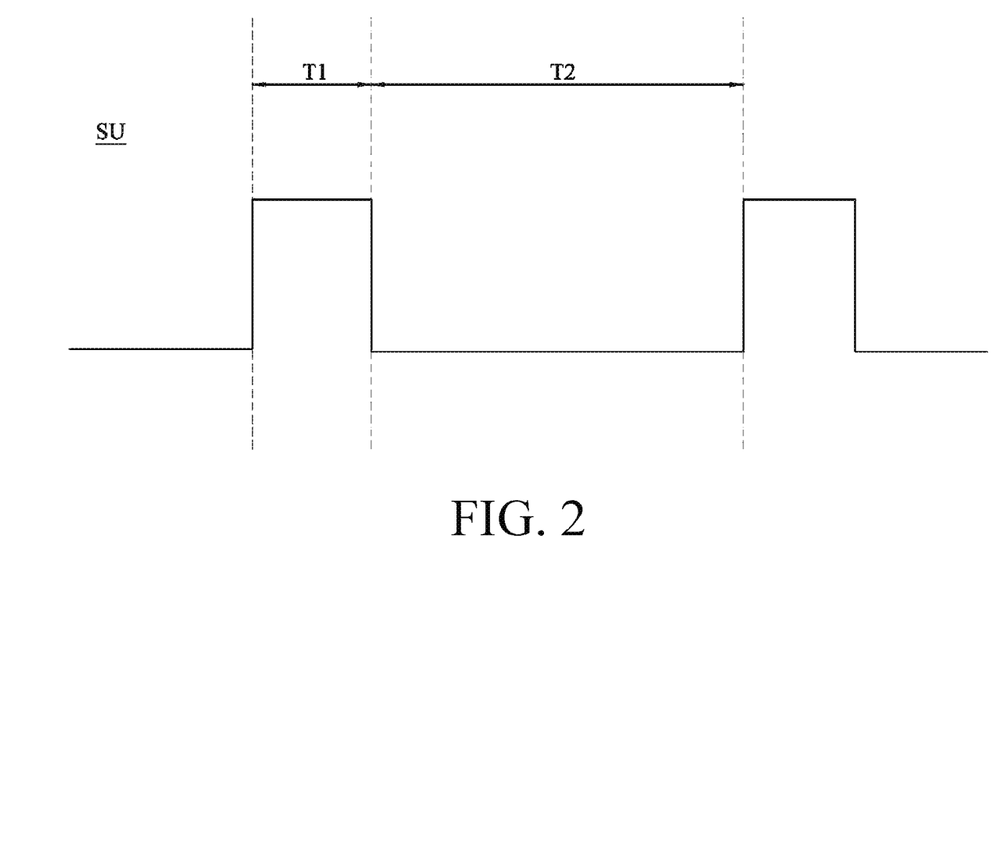
FIG. 2 is a schematic diagram of a first drive signal in FIG. 1 according to an embodiment of the disclosure.

In various embodiments, a plurality of detection methods mentioned above is independently or simultaneously used. FIG. 2 is a schematic diagram of a first drive signal SU in FIG. 1 according to an embodiment of the disclosure. As shown in FIG. 2, in a time period T1, the first switch M1 is turned on. In a time period T2, the first switch M1 is turned off. In the time period T1, the detection circuit 160 is configured to detect the voltage level VS and the voltage level VG In the time period T2, the detection circuit 160 is configured to detect the voltage level VS and the voltage level VD. Alternatively, in time periods T1 and T2, the detection circuit 160 is configured to detect the input voltage Vin. The configuration methods above are selected based on an actual application.

Figure 3:
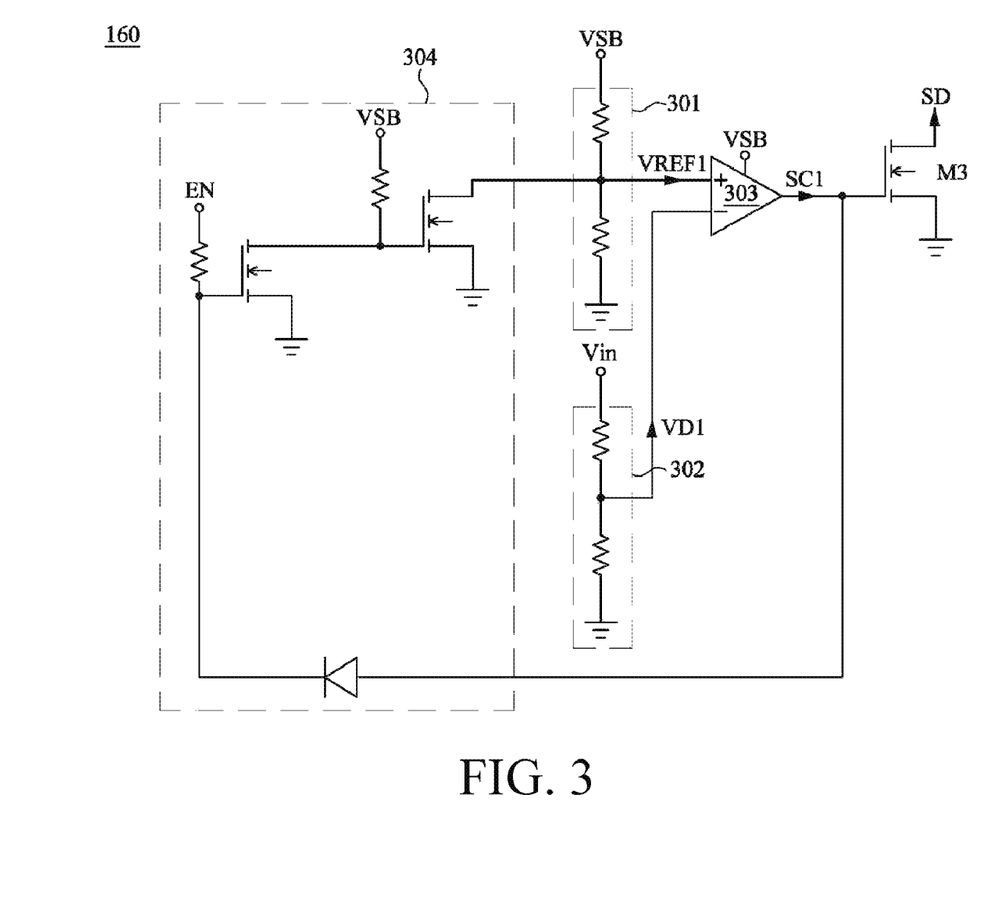
FIG. 3 is a schematic diagram of a detection circuit in FIG. 1 according to an embodiment of the disclosure.

Referring to FIG. 3, FIG. 3 is a schematic diagram of a detection circuit 160 in FIG. 1 according to an embodiment of the disclosure. In this embodiment, the detection circuit 160 is configured to determine whether the first switch M1 is short-circuited or not based on the input voltage Vin (that is, the voltage level VD).

As shown in FIG. 3, the detection circuit 160 includes a first bleeder circuit 301, a second bleeder circuit 302, a comparator 303, and a third switch M3. In an embodiment, the first bleeder circuit 301 and the second bleeder circuit 302 are implemented by using a plurality of resistors coupled in series, but the disclosure is not limited herein. The first bleeder circuit 301 divides a standby voltage VSB to generate a reference voltage VREF1 to a positive input end of the comparator 303. The second bleeder circuit 302 divides the input voltage Vin to generate a detection voltage VD1 to a negative input end of the comparator 303. The comparator 303 is coupled to the first bleeder circuit 301 and the second bleeder circuit 302 to receive the reference voltage VREF1 and the detection voltage VD1. The comparator 303 compares the reference voltage VREF1 with the detection voltage VD1 to output a comparison signal SC1.

When the reference voltage VREF1 is lower than the detection voltage VD1, the comparator 303 outputs the comparison signal SC1 of a low voltage (a logic value 0). In this condition, the first switch M1 is in normal operation. When the reference voltage VREF1 is higher than the detection voltage VD1, the comparator 303 outputs the comparison signal SC1 of a high voltage (a logic value 1). In this condition, the first switch M1 is abnormal (in an embodiment, the first switch M1 is short-circuited).

As shown in FIG. 1, the input voltage Vin is input into the first end of the first switch M1. When the first switch M1 is short-circuited, a level of the input voltage Vin is lowered, so that the detection voltage VD1 is lower than the reference voltage VREF1. Therefore, when the comparator 303 outputs the comparison signal SC1 of the high voltage (the logic value 1), it is determined that the first switch M1 is short-circuited.

A control end of the third switch M3 is coupled to an output end of the comparator 303 to receive the comparison signal SC1. A first end of the third switch M3 outputs the detection signal SD, and a second end of the third switch M3 is coupled to the ground. The third switch M3 outputs the detection signal SD based on the comparison signal SC1. When the first switch M1 is not short-circuited, the comparator 303 outputs the comparison signal SC1 of the low voltage (the logic value 0). In this way, the third switch M3 is turned off without changing a signal value of the detection signal SD.

When the first switch M1 is short-circuited, the comparator 303 outputs the comparison signal SC1 of the high voltage (the logic value 1). In this condition, the third switch M3 is turned on, and a voltage level of the first end of the third switch M3 is pulled down to the ground. In this way, when the first switch M1 is short-circuited, the detection signal SD is at a low voltage (a logic value 0). Therefore, the PWM circuit 148 in FIG. 1 can adjust the second drive signal SL based on the detection signal SD of the low voltage (the logic value 0) to turn on the second switch M2.

In an embodiment, as shown in FIG. 3, the detection circuit 160 further includes an enabling circuit 304. The enabling circuit 304 is coupled to the first bleeder circuit 301 and the output end of the comparator 303. The enabling circuit 304 enables the first bleeder circuit 301 based on the enabling signal EN and the standby voltage VSB. When the enabling signal EN is at a high voltage (a logic value 1), the first bleeder circuit 301 is enabled, to enable an operation of the detection circuit 160 to take effect. The enabling circuit 304 in FIG. 3 is merely an example, and various enabling circuits 304 capable of ensuring that the operation of the detection circuit 160 correctly takes effect shall fall within the scope of the disclosure.

Generally, when an OVP circuit is used to protect a power supply, it takes a long time to detect that the first switch M1 is abnormal. Consequently, the load is not effectively protected in real time. In an embodiment, when the first switch M1 is short-circuited, the input voltage Vin starts to decrease. In this condition, a current of the output inductor L continuously rises in a period of time to enable the output voltage Vout to rise. After detecting that the output voltage Vout is higher than a specific voltage, the OVP circuit determines that the first switch M1 is short-circuited and therefore performs a related operation of protecting the load. Compared with the OVP circuit in the foregoing related art, the detection circuit 160 in FIG. 3 determines whether the first switch M1 is abnormal or not by directly detecting the input voltage Vin. In this way, compared with foregoing related art, the disclosure more effectively achieves an objective of quickly protecting a load.

Figure 4:
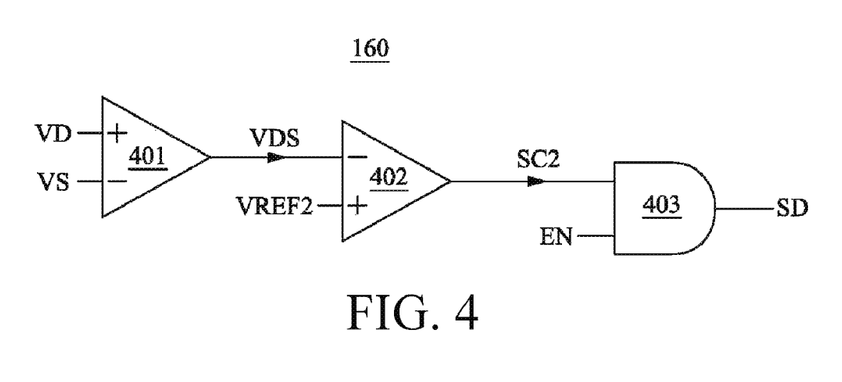
FIG. 4 is a schematic diagram of a detection circuit in FIG. 1 according to an embodiment of the disclosure.

Referring to FIG. 4, FIG. 4 is a schematic diagram of a detection circuit 160 in FIG. 1 according to an embodiment of the disclosure. In this embodiment, in the time period T2 in FIG. 2, the detection circuit 160 is configured to determine whether the first switch M1 is short-circuited or not based on the voltage level VD and the voltage level VS.

As shown in FIG. 4, the detection circuit 160 includes an amplifier 401, a comparator 402, and a logic gate 403. A positive input end of the amplifier 401 is coupled to the first end of the first switch M1 in FIG. 1, a negative input end of the amplifier 401 is coupled to the second end (that is, the endpoint PHASE) of the first switch M1 in FIG. 1, and an output end of the amplifier 401 is coupled to a negative input end of the comparator 402 to transmit a difference signal VDS. In an embodiment, the amplifier 401 is implemented by using a differential amplifier.

In this embodiment, the amplifier 401 outputs the difference signal VDS based on the voltage level VD and the voltage level VS. In an embodiment, the amplifier 401 amplifies a voltage difference between the voltage level VD and the voltage level VS to generate the difference signal VDS. A positive input end of the comparator 402 receives a reference voltage VREF2. The comparator 402 compares the reference voltage VREF2 with the difference signal VDS to generate a comparison signal SC2. An input end of the logic gate 403 is coupled to an output end of the comparator 402 to receive the comparison signal SC2, and the other input end of the logic gate 403 receives the enabling signal EN. The logic gate 403 generates the detection signal SD based on the comparison signal SC2 and the enabling signal EN. In an embodiment, the logic gate 403 is an AND gate, but the disclosure is not limited herein.

When the reference voltage VREF2 is lower than the difference signal VDS, the comparator 402 outputs the comparison signal SC2 of a low voltage (a logic value 0). In this condition, the first switch M1 is in normal operation. When the reference voltage VREF2 is higher than the difference signal VDS, the comparator 402 outputs the comparison signal SC2 of a high voltage (a logic value 1). In this condition, the first switch M1 is abnormal (in an embodiment, the first switch M1 is short-circuited). When the first switch M1 is short-circuited, the first end of the first switch M1 and the second end of the first switch M1 form a path. Therefore, the voltage level VD is approximately equal to the voltage level VS. In other words, when the first switch M1 is short-circuited, the difference signal VDS is lowered. Therefore, when the comparator 402 outputs the comparison signal SC2 of the high voltage (the logic value 1), it is determined that the first switch M1 is short-circuited.

When the first switch M1 is in normal operation, the comparison signal SC2 is at a low voltage (the logic value 0). In this way, the logic gate 403 outputs the detection signal SD of the low voltage (the logic value 0) to turn off the second switch M2. Alternatively, when the first switch M1 is short-circuited, the comparison signal SC2 is at a high voltage. In this way, when the enabling signal EN is also at the high voltage (the logic value 1), the logic gate 403 outputs the detection signal SD of a high voltage (a logic value 1) to turn on the second switch M2.

In another embodiment, an output end of the logic gate 403 is directly connected to the control end (that is, the endpoint LGATE) of the second switch M2. Thus, the detection signal SD output by the logic gate 403 is directly used as the second drive signal SL to turn on the second switch M2 when the first switch M1 is short-circuited.

Figure 5:
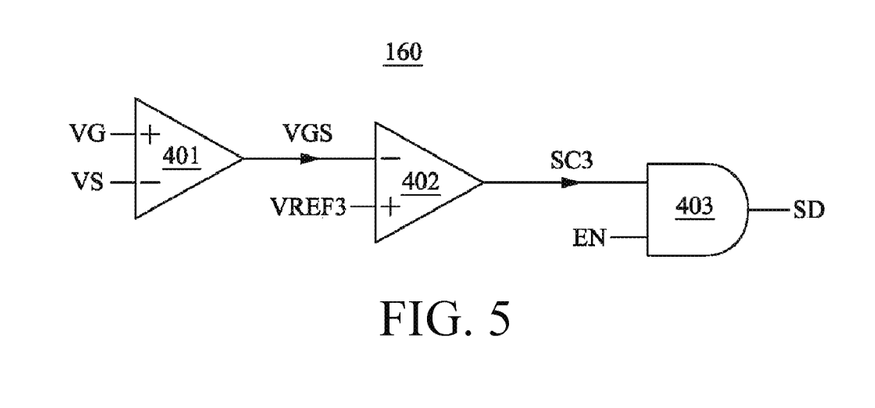
FIG. 5 is a schematic diagram of a detection circuit in FIG. 1 according to an embodiment of the disclosure.

Referring to FIG. 5, FIG. 5 is a schematic diagram of a detection circuit 160 in FIG. 1 according to an embodiment of the disclosure. For ease of understanding, elements in FIG. 5 that are similar to those in FIG. 4 are specified by using same reference signs. In this embodiment, in the time period T1 in FIG. 2, the detection circuit 160 is configured to determine whether the first switch M1 is short-circuited or not based on the voltage level VG and the voltage level VS.

Compared with FIG. 4, the positive input end of the amplifier 401 in FIG. 5 is coupled to the control end (that is, the endpoint UGATE) of the first switch M1 in FIG. 1. In other words, in this embodiment, the amplifier 401 generates a difference signal VGS based on the voltage level VG and the voltage level VS. In an embodiment, the amplifier 401 amplifies a voltage difference between the voltage level VG and the voltage level VS to generate the difference signal VGS.

As shown in FIG. 5, a positive input end of the comparator 402 receives a reference voltage VREF3, and the negative input end of the comparator 402 is coupled to the output end of the comparator 402 to receive the difference signal VGS. The comparator 402 compares the reference voltage VREF3 with the difference signal VGS to generate a comparison signal SC3. In this embodiment, when the reference voltage VREF3 is lower than the difference signal VGS, the comparator 402 outputs the comparison signal SC3 of a low voltage (a logic value 0).

In this condition, the first switch M1 is in normal operation. When the reference voltage VREF3 is higher than the difference signal VGS, the comparator 402 outputs the comparison signal SC3 of a high voltage (a logic value 1). In this condition, the first switch M1 is abnormal (in an embodiment, the first switch M1 is short-circuited). As described above, the detection circuit 160 in this embodiment is operated in the time period T1 in FIG. 2. In the time period T1, the first drive signal SU is at a high voltage. In this way, the voltage level VG in the time period T1 is inferred as a high voltage. When the first switch M1 is short-circuited, the voltage level VD is approximately equal to the voltage level VS, and the voltage level VD is associated with the input voltage Vin.

In other words, when the first switch M1 is short-circuited, the voltage level VS is approximately equal to the input voltage Vin. In the time period T1, when the first switch M1 is short-circuited, the voltage level VG and the input voltage Vin are both high voltages, so that the difference signal VGS is lowered. Therefore, when the comparator 402 outputs the comparison signal SC3 of the high voltage (the logic value 1), it is determined that the first switch M1 is short-circuited.

When the first switch M1 is in normal operation, the comparison signal SC3 is at the low voltage (the logic value 0). In this way, the logic gate 403 outputs the detection signal SD of the low voltage (the logic value 0) to turn off the second switch M2. When the first switch M1 is short-circuited, the comparison signal SC3 is at the high voltage. When the enabling signal EN is also at the high voltage (the logic value 1), the logic gate 403 outputs the detection signal SD of the high voltage (the logic voltage) to turn on the second switch M2.

In another embodiment, the output end of the logic gate 403 is also directly connected to the control end (that is, the endpoint LGATE) of the second switch M2. In this connection method, the detection signal SD output by the logic gate 403 is directly used as the second drive signal SL to turn on the second switch M2 when the first switch M1 is short-circuited.

Compared with a commonly used OVP circuit, in the disclosure, voltage levels (that is, voltage levels VD and VS, or voltage levels VG and VS) at both ends of the first switch M1 are detected to determine whether the first switch M1 is abnormal or not. This more effectively achieves to quickly protect a load.

In an embodiment, voltage values of reference voltages VREF1 to VREF3 in the foregoing embodiments are the same or different. The voltage values of the reference voltages VREF1 to VREF3 are correspondingly set based on an actual application.

Figure 6:
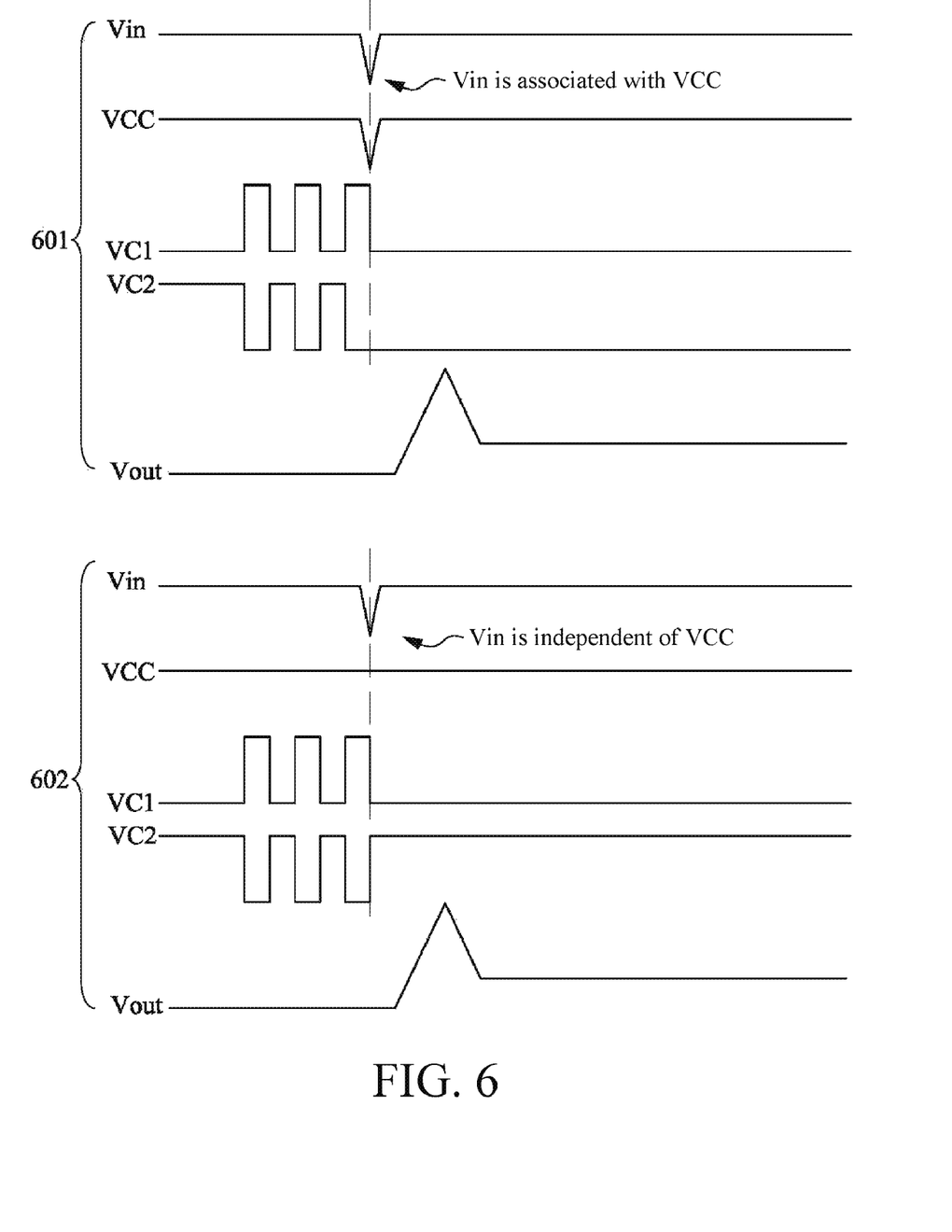
FIG. 6 is a schematic diagram of waveforms of a plurality of voltages or signals in FIG. 1 according to an embodiment of the disclosure.

FIG. 6 is a schematic diagram of waveforms of a plurality of voltages or signals in FIG. 1 according to an embodiment of the disclosure. In an embodiment, the drive circuit 140 in FIG. 1 and the detection circuit 160 mentioned in the foregoing embodiments are disposed such that the voltage VCC supplies power to them, and the voltage regulator circuit 120 is disposed such that the input voltage Vin supplies power to it. In an embodiment, the voltage VCC is independent of the input voltage Vin.

Generally, the voltage VCC and the input voltage Vin are associated with each other. In an embodiment, the voltage VCC and the input voltage Vin are directly set as a same voltage, or set as from a same power supply. As shown in a waveform 601 in FIG. 6, in the technologies, when the first switch M1 is short-circuited, the input voltage Vin is lowered and the voltage VCC is synchronously lowered. In this way, when the voltage VCC is too low, the drive circuit 140 does not work effectively and stops outputting the first drive signal SU and the second drive signal SL, making the output voltage Vout excessively high and damaging the load.

As shown in a waveform 602, compared with the foregoing technologies, the voltage VCC in the disclosure is set as independent of the input voltage Vin. When the input voltage Vin is lowered because the first switch M1 is short-circuited, the voltage VCC is not affected. Therefore, the detection circuit 160 and the drive circuit 140 work normally, to protect a load in real time. In an embodiment, the voltage VCC is provided by an independent power module. In an embodiment, the voltage VCC is alternatively another standby voltage.

Figure 7:
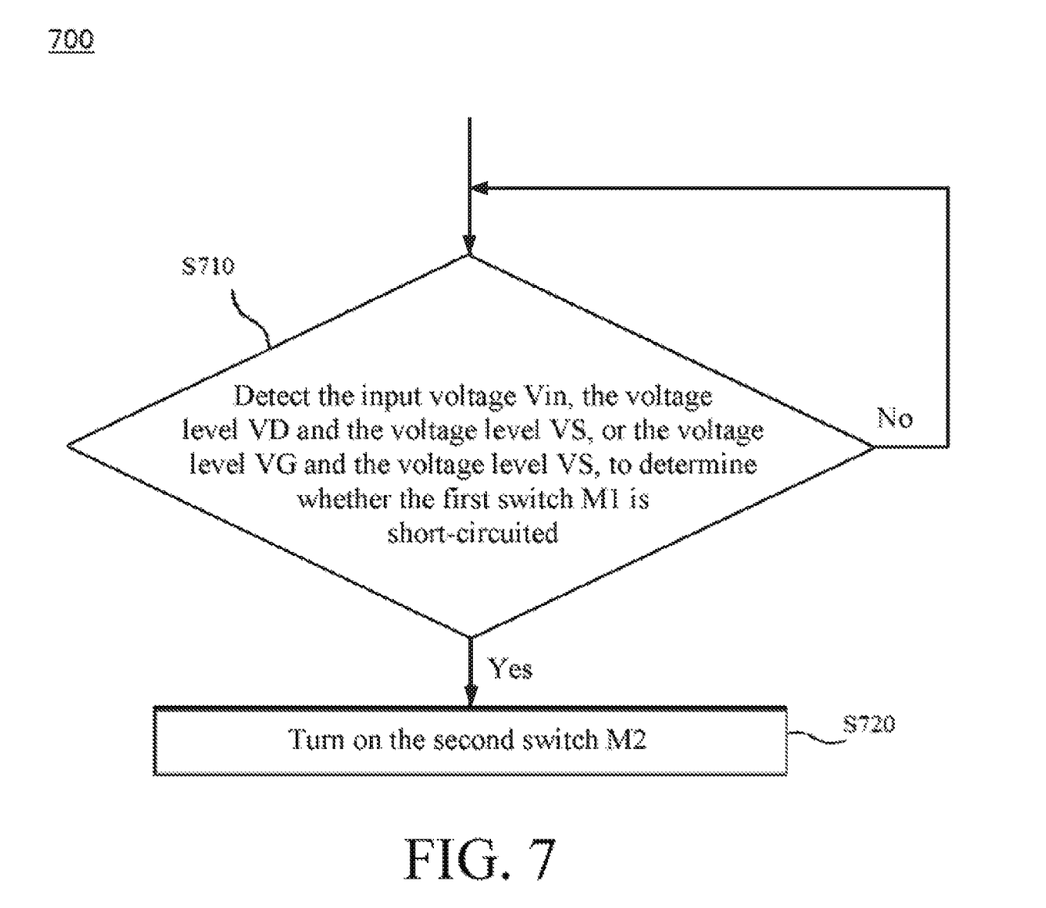
FIG. 7 is a flowchart of a power supply control method according to an embodiment of the disclosure.

FIG. 7 is a flowchart of a power supply control method 700 according to an embodiment of the disclosure. To understand the disclosure in a better manner, the power supply control method 700 is described with reference to the power conversion circuit 100 and the detection circuit 160 in the foregoing embodiments, but the disclosure is not limited herein.

In an embodiment, the power supply control method 700 includes step S710 and step S720.

In the step S710, the detection circuit 160 detects the input voltage Vin, the voltage level VD and the voltage level VS, or the voltage level VG and the voltage level VS, to determine whether the first switch M1 is short-circuited or not. When the first switch M1 is short-circuited, step S720 is performed. When the first switch M1 is not short-circuited, the step S710 is performed again. In the step S720, the second switch M2 is turned on to prevent a load from being damaged.

As shown in FIG. 3, the detection circuit 160 detects the input voltage Vin to determine whether the first switch M1 is short-circuited or not. As shown in FIG. 4 and FIG. 5 and FIG. 6, the detection circuit 160 detects the voltage level VD and the voltage level VS or detects the voltage level VG and the voltage level VS to determine whether the first switch M1 is short-circuited or not. When it is detected that the first switch M1 is short-circuited, the drive circuit 140 outputs the corresponding second drive signal SL to turn on the second switch M2. In this way, an internal voltage of the voltage regulator circuit 120 is bypassed to the ground through the second switch M2 to prevent a load from being damaged.

Although the present invention is disclosed above by using the embodiments, they are not intended to limit the present invention. A person skilled in the art can make variations or modifications without departing from the spirit or scope of the present invention. Therefore, the protection scope of the present invention should be subject to the appended claims.

What is claimed is:

1. A power conversion circuit, comprising:
a voltage regulator circuit, comprising:
a first switch, a first end of the first switch receiving an input voltage, and a control end of the first switch receiving a first drive signal; and
a second switch, coupled between a second end of the first switch and the ground, the second switch being turned on or off based on a second drive signal, and the first switch and the second switch regulating the input voltage to output an output voltage; and
a detection circuit, configured to determine whether the first switch is short-circuited or not based on a voltage level of at least one of the first end, the second end, or the control end of the first switch, and adjust the second drive signal when the first switch is short-circuited to turn on the second switch, wherein the detection circuit comprises:
a first bleeder circuit, configured to divide a standby voltage to generate a reference voltage;
a second bleeder circuit, configured to divide a first voltage level of the first end of the first switch to generate a detection voltage;
a comparator, coupled to the first bleeder circuit and the second bleeder circuit, and configured to compare the reference voltage with the detection voltage to output a comparison signal; and
a third switch, configured to output a detection signal based on the comparison signal; and
an enabling circuit, configured to enable the first bleeder circuit based on an enabling signal and the standby voltage.

2. The power conversion circuit according to claim 1, wherein the detection circuit outputs a detection signal based on the voltage level of the at least one of the first end, the second end, or the control end of the first switch, and the power conversion circuit further comprises:
a pulse width modulation (PWM) circuit, configured to generate a PWM signal based on the detection signal and a preset pulse signal; and
a drive circuit, configured to generate the first drive signal and the second drive signal based on the PWM signal, and output the second drive signal when the first switch is short-circuited to turn on the second switch.

3. The power conversion circuit according to claim 2, wherein a first voltage supplies power to the drive circuit and the detection circuit, and the first voltage is independent of the input voltage.

4. The power conversion circuit according to claim 1, wherein the detection circuit detects voltage levels of the first end of the first switch when the first switch is turned on and off.

\* \* \* \* \*